(12) United States Patent
Zhang et al.

(10) Patent No.: US 12,043,259 B2
(45) Date of Patent: Jul. 23, 2024

(54) METHOD AND DEVICE FOR PARKING CONTROL, VEHICLE CONTROLLER, AND NEW-ENERGY VEHICLE

(71) Applicant: GREAT WALL MOTOR COMPANY LIMITED, Hebei (CN)

(72) Inventors: Shuai Zhang, Hebei (CN); Shujiang Chen, Hebei (CN); Wentao Hou, Hebei (CN); Xinran Dong, Hebei (CN); Ce Sun, Hebei (CN); Jiaxin Sun, Hebei (CN); Weifeng Deng, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 259 days.

(21) Appl. No.: 17/790,196

(22) PCT Filed: Jan. 7, 2021

(86) PCT No.: PCT/CN2021/070598
§ 371 (c)(1),
(2) Date: Jun. 30, 2022

(87) PCT Pub. No.: WO2021/139710
PCT Pub. Date: Jul. 15, 2021

(65) Prior Publication Data
US 2023/0060311 A1 Mar. 2, 2023

(30) Foreign Application Priority Data

Jan. 7, 2020 (CN) .......................... 202010015584.5

(51) Int. Cl.
*B60W 30/18* (2012.01)
(52) U.S. Cl.
CPC . *B60W 30/18109* (2013.01); *B60W 2510/182* (2013.01); *B60W 2510/186* (2013.01)

(58) Field of Classification Search
CPC ..... B60W 30/18109; B60W 2510/186; B60W 2510/182; B60T 2270/60; B60L 15/2009;
(Continued)

(56) References Cited

U.S. PATENT DOCUMENTS

2021/0122387 A1* 4/2021 Hoop .................. B60W 10/184

FOREIGN PATENT DOCUMENTS

| CN | 104554199 A | 4/2015 |
| CN | 104924918 A | 9/2015 |

(Continued)

OTHER PUBLICATIONS

International Search Report for PCT/CN2021/070598 issued Mar. 26, 2021.

*Primary Examiner* — Tyler J Lee
*Assistant Examiner* — Yufeng Zhang
(74) *Attorney, Agent, or Firm* — Schmeiser, Olsen & Watts, LLP

(57) ABSTRACT

A method for parking control is provided in the present application, which includes the following steps: determining whether a single-pedal mode is activated; determining whether conditions for deceleration control are met when the single-pedal mode is activated; controlling the new-energy vehicle to decelerate when the conditions for deceleration control are met; determining whether conditions for sending a brake request to a motor controller are met during a process of controlling the new-energy vehicle to decelerate; sending the brake request to the motor controller when the conditions for sending a brake request to the motor controller are met; and sending a parking request to an electronic handbrake when the new-energy vehicle is in the brake mode and the speed of the new-energy vehicle is smaller than the third preset value for a third preset time, enable the new-energy vehicle to enter in a parking mode.

19 Claims, 4 Drawing Sheets

Figure 1:
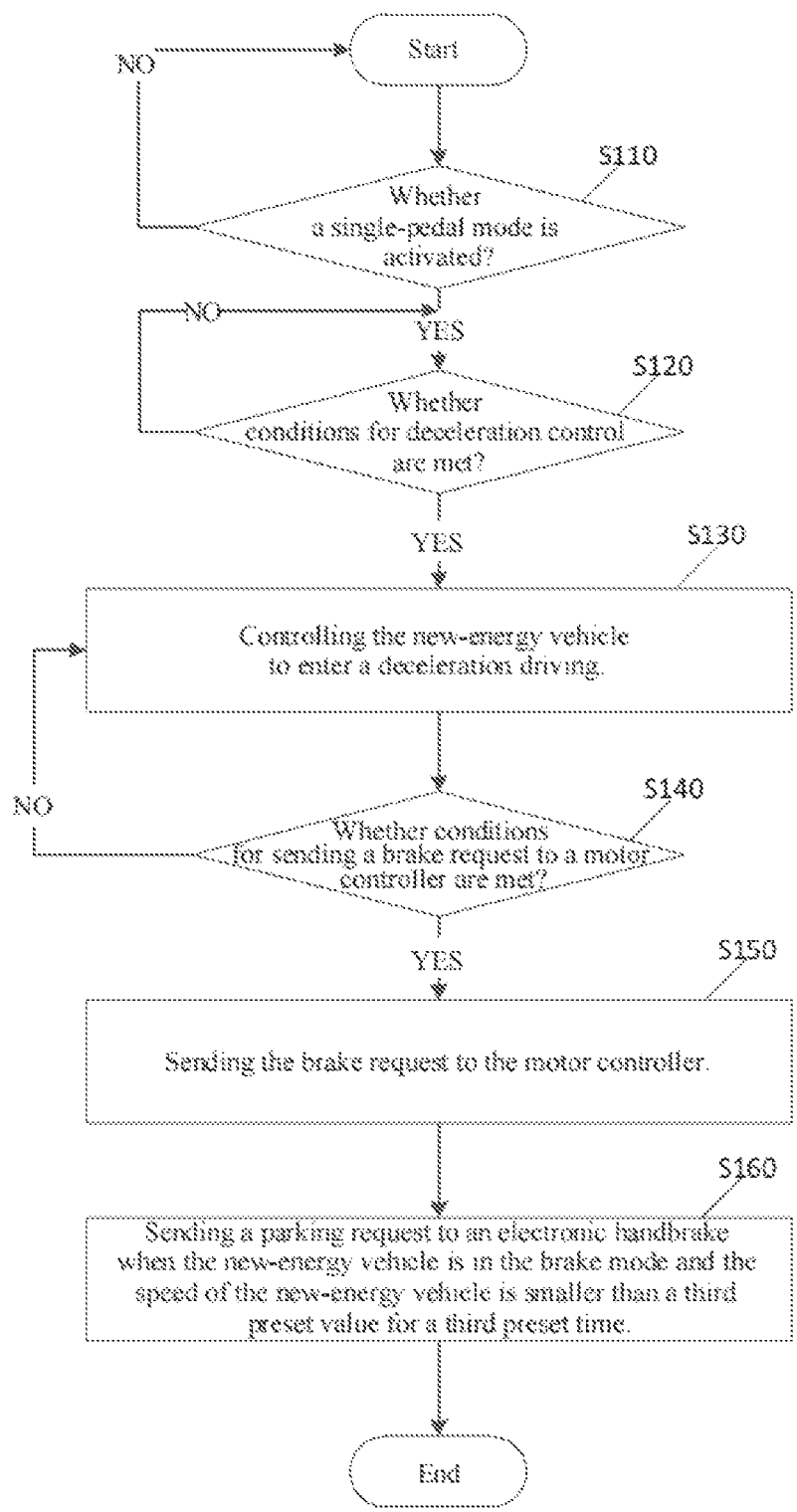

(58) Field of Classification Search
CPC ............. B60L 2240/12; B60L 2250/26; B60L 2250/24; B60L 2260/22
See application file for complete search history.

(56) References Cited

FOREIGN PATENT DOCUMENTS

| | | | |
|---|---|---|---|
| CN | 106740749 | A | 5/2017 |
| CN | 107627901 | A | 1/2018 |
| CN | 108082152 | A | 5/2018 |
| CN | 108909526 | A | 11/2018 |
| CN | 108909711 | A | 11/2018 |
| CN | 109466341 | A | 3/2019 |
| CN | 109968989 | A | 7/2019 |
| JP | 2010112248 | A | 5/2010 |
| WO | 2017220429 | A1 | 12/2017 |

* cited by examiner

METHOD AND DEVICE FOR PARKING CONTROL, VEHICLE CONTROLLER, AND NEW-ENERGY VEHICLE

CROSS-REFERENCE TO RELATED APPLICATIONS

This application claims priority to PCT Application No. PCT/CN2021/070598, having a filing date of Jan. 7, 2021, which claims priority to Chinese Application No. 202010015584.5, having a filing date of Jan. 7, 2020, the entire contents both of which are incorporated herein by reference.

FIELD OF TECHNOLOGY

The following relates to the field of new-energy vehicle technology, and more particularly, to a method and a device for parking control of a new-energy vehicle, a vehicle controller, and a new-energy vehicle.

BACKGROUND

With the development of new-energy vehicle technology, the concept of "single pedal" control has gradually emerged in the new-energy vehicle industry in recent years, that is, the acceleration/uniform-speed/deceleration control of the vehicle can be realized through one accelerator pedal. The "single pedal" control can reduce the frequency of using a brake pedal, and thus the energy utilization rate and driving experience of the vehicle can be improved, and the driving fatigue can be reduced. In related technologies, however, there is no effective strategy for deceleration control that is performed based on the "single pedal" mode.

SUMMARY

An aspect relates to a method for parking control of a new-energy vehicle, to realize a strategy for parking control in a single-pedal mode.

To achieve the above aspect, embodiments of the present application may be implemented as follows:

A method for parking control of a new-energy vehicle is provided, which is executed by a vehicle controller. The method for parking control of a new-energy vehicle includes the follows steps: determining whether a single-pedal mode is activated; determining whether conditions for deceleration control are met when the single-pedal mode is activated; controlling the new-energy vehicle to decelerate when the conditions for deceleration control are met; determining whether conditions for sending a brake request to a motor controller are met during a process of controlling the new-energy vehicle to decelerate; sending the brake request to the motor controller when the conditions for sending a brake request to the motor controller are met; sending a parking request to an electronic handbrake when the new-energy vehicle is in the brake mode and the speed of the new-energy vehicle is smaller than the third preset value for a third preset time, to enable the new-energy vehicle to enter a parking mode. The conditions for deceleration control at least include that a gear of the new-energy vehicle is a driving gear, a creep mode is not activated, and a speed of the new-energy vehicle is not greater than a first preset value for a first preset time. The conditions for sending the brake request at least include that the speed is not greater than a second preset value for a second preset time, and the second preset value is smaller than the first preset value. The motor controller, in response to the brake request, controls the new-energy vehicle to enter a brake mode, to reduce the speed of the new-energy vehicle to be smaller than a third preset value, and the third preset value is smaller than the second preset value.

In an embodiment, the conditions for deceleration control also include one or more of the following items: the vehicle is in a READY state; the single pedal is in a valid state; no brake request is sent by the vehicle controller to the motor controller; an opening-degree of an accelerator pedal is not greater than a first preset opening-degree; a brake pedal is not enabled or a pressure of a master brake cylinder is not greater than a first preset pressure for a fourth preset time; both a handbrake and the electronic handbrake are not activated; an available electric power for driving is not smaller than a first preset power, and a power system of the new-energy vehicle has no fault.

In an embodiment, the method for parking control of a new-energy vehicle also includes a step of controlling the new-energy vehicle to exit a deceleration driving, during the process of controlling the new-energy vehicle to decelerate, when the conditions for deceleration control are not met.

In an embodiment, the conditions for sending the brake request also include one or more of the following items: the vehicle is in a READY state; the single pedal is in a valid state; an opening-degree of an accelerator pedal is not greater than a second preset opening-degree; a brake pedal is not enabled or a pressure of a master brake cylinder is not greater than a second preset pressure for a fifth preset time; the creep mode is not activated; the gear is the driving gear; both a handbrake and the electronic handbrake are not activated; an available electric power for driving is not smaller than a second preset power; and a power system of the new-energy vehicle has no fault.

In an embodiment, the method for parking control of a new-energy vehicle also includes steps of: determining, in response to the new-energy vehicle entering the brake mode, whether the conditions for sending the brake request are met; and sending a request for exiting the brake mode to the motor controller when the conditions for sending the brake request are not met. The motor controller, in response to the request for exiting the brake mode, controls the new-energy vehicle to exit the brake mode.

In an embodiment, the method for parking control of a new-energy vehicle also includes a step of sending, in case that the new-energy vehicle is in the parking mode, a request for exiting the parking mode to the electronic handbrake when the new-energy vehicle is controlled to exit the brake mode or the speed of the new-energy vehicle is not smaller than the third preset value.

In an embodiment, the motor controller, in response to the brake request, controls the new-energy vehicle to enter the brake mode includes that: the motor controller, in response to receiving the brake request, determines whether conditions for entering the brake mode are met; and the motor controller controls the new-energy vehicle to enter the brake mode when the conditions for entering the brake mode are met. The motor controller, after the new-energy vehicle is entered the brake mode, controls the new-energy vehicle to exit the brake mode when conditions for exiting the brake mode are met. The conditions for entering the brake mode include that the brake request is received, the vehicle controller stops controlling the new-energy vehicle to decelerate, the motor speed is within a preset range for a sixth preset time, and the motor controller has no fault. The conditions for exiting the brake mode include one or more of the following items: a request for exiting the brake mode is received; the vehicle controller starts to control the new-energy vehicle to decelerate; a motor speed is greater than a seventh preset value for a sixth preset time; and the motor controller has a fault.

Compared with the existed technologies, the method for parking control of a new-energy vehicle provided in the present application has the following advantages:

In case that the single-pedal mode is activated, the vehicle controller controls the vehicle to decelerate if the conditions for deceleration control are met. In case that the vehicle is in a deceleration driving, a brake request is sent by the vehicle controller to the motor controller if the conditions for sending a brake request are met. In response to the brake request, the motor controller can control the vehicle to enter the brake mode. In the brake mode, a parking request can be sent by the vehicle controller to the electronic handbrake if the speed of the new-energy vehicle is smaller than the third preset value for a third preset time, and the electronic handbrake, in response to the parking request, can control the vehicle to park. As a result, the vehicle, by the coordinated control of the vehicle controller, the motor controller, and the electronic handbrake, and by identifying the driver's operation intention in real time, can be stopped and parked smoothly without requiring the brake pedal in the single-pedal mode.

Another aspect of the present application is to provide a device for parking control of a new-energy vehicle, to realize a strategy for parking control in the single-pedal mode.

To achieve the above aspect, embodiments of the present application may be implemented as follows:

A device for parking control of a new-energy vehicle is provided, which is arranged on a vehicle controller. The device for parking control of a new-energy vehicle includes a first determination module, a second determination module, a control module, a third determination module, a first sending module, and a second sending module. The first determination module is configured to determine whether a single-pedal mode is activated. The second determination module is configured to determine whether conditions for deceleration control are met when the single-pedal mode is activated. The conditions for deceleration control at least include that a speed of the new-energy vehicle is smaller than a first preset value for a first preset time. The control module is configured to control the new-energy vehicle to decelerate when the conditions for deceleration control are met. The third determination module is configured to determine whether conditions for sending a brake request to a motor controller are met during a process of controlling the new-energy vehicle to decelerate. The conditions for sending the brake request at least include that the speed is not greater than a second preset value for a second preset time, and the second preset value is smaller than the first preset value. The first sending module is configured to send the brake request to the motor controller when the conditions for sending the brake request to the motor controller are met. The motor controller, in response to the brake request, controls the new-energy vehicle to enter a brake mode, to reduce the speed of the new-energy vehicle to be smaller than a third preset value. The third preset value is smaller than the second preset value. The second sending module is configured to send a parking request to an electronic handbrake when the new-energy vehicle is in the brake mode and the speed of the new-energy vehicle is smaller than the third preset value for a third preset time.

In an embodiment, the conditions for deceleration control also include one or more of the following items: the vehicle is in a READY state; the single pedal is in a valid state; no brake request is sent by the vehicle controller to the motor controller; an opening-degree of an accelerator pedal is not greater than a first preset opening-degree; a brake pedal is not enabled or a pressure of a master brake cylinder is not greater than a first preset pressure for a fourth preset time; both a handbrake and the electronic handbrake are not activated; an available electric power for driving is not smaller than a first preset power; and a power system of the new-energy vehicle has no fault.

In an embodiment, the control module is also configured to control the new-energy vehicle to exit a deceleration driving, during the process of controlling the new-energy vehicle to decelerate, when the conditions for deceleration control are not met.

In an embodiment, the conditions for sending a brake request also include one or more of the following items: the vehicle is in a READY state; the single pedal is in a valid state; an opening-degree of an accelerator pedal is not greater than a second preset opening-degree; a brake pedal is not enabled or a pressure of a master brake cylinder is not greater than a second preset pressure for a fifth preset time; a creep mode is not activated; a gear of the new-energy vehicle is a driving gear; both a handbrake and the electronic handbrake are not activated; an available electric power for driving is not smaller than a second preset power; and a power system of the new-energy vehicle has no fault.

In an embodiment, the third determination module is also configured to determine whether the conditions for sending the brake request are met in response to the new-energy vehicle entering the brake mode. The first sending module is also configured to send a request for exiting the brake mode to the motor controller when the conditions for sending the brake request are not met. The motor controller, in response to the request for exiting the brake mode, controls the new-energy vehicle to exit the brake mode.

In an embodiment, the second sending module is also configured to send, in case that the new-energy vehicle is in the parking mode, a request for exiting the parking mode to the electronic handbrake when the new-energy vehicle is controlled to exit the brake mode or the speed of the new-energy vehicle is not smaller than the third preset value.

In an embodiment, the motor controller, in response to the brake request, controls the new-energy vehicle to enter the brake mode includes that: the motor controller, in response to receiving the brake request, determines whether conditions for entering the brake mode are met; and the motor controller controls the new-energy vehicle to enter the brake mode when the conditions for entering the brake mode are met. The motor controller, after the new-energy vehicle is entered the brake mode, controls the new-energy vehicle to exit the brake mode when conditions for exiting the brake mode are met. The conditions for entering the brake mode include that the brake request is received, the vehicle controller stops controlling the new-energy vehicle to decelerate, the motor speed is within a preset range for a sixth preset time, and the motor controller has no fault. The conditions for exiting the brake mode include one or more of the following items: a request for exiting the brake mode is received; the vehicle controller starts to control the new-energy vehicle to decelerate; a motor speed is greater than a seventh preset value for a sixth preset time; and the motor controller is faulty.

The device for parking control of a new-energy vehicle has the same advantages as the above-mentioned method for parking control of a new-energy vehicle compared to the conventional art, which will not be repeated here.

Correspondingly, an embodiment of the present application also provides a vehicle controller. The vehicle controller includes the above-mentioned device for parking control of a new-energy vehicle.

Correspondingly, an embodiment of the present application also provides a new-energy vehicle. The new-energy vehicle includes the above-mentioned vehicle controller.

Other features and advantages of the present application will be described in detail in the subsequent section of detailed description of embodiments.

BRIEF DESCRIPTION

Figure 2:
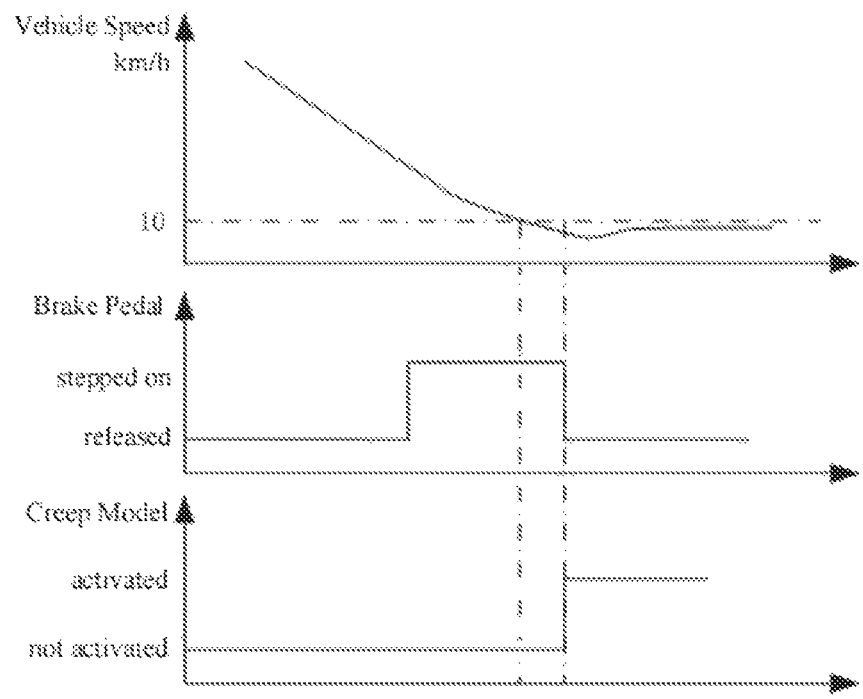
Figure 3:
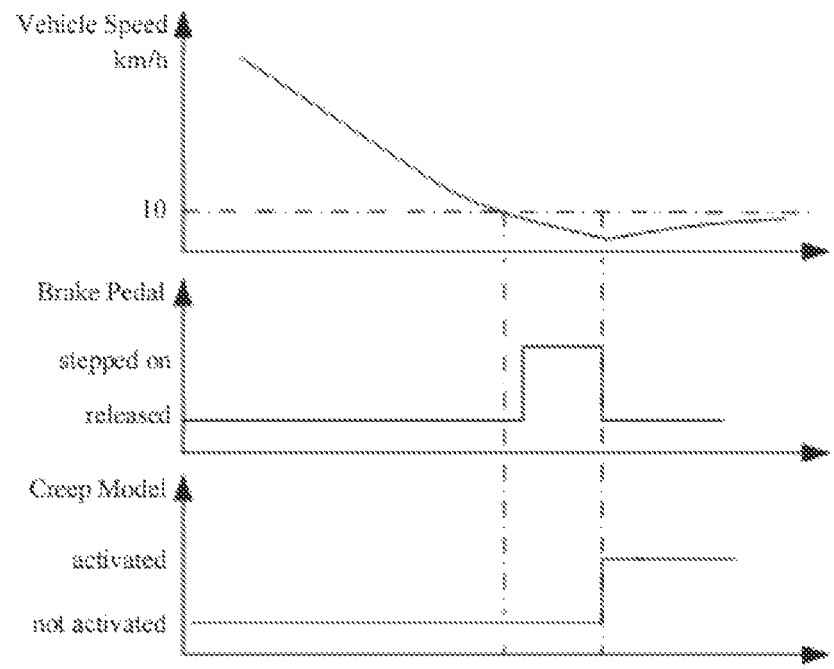
Figure 4:
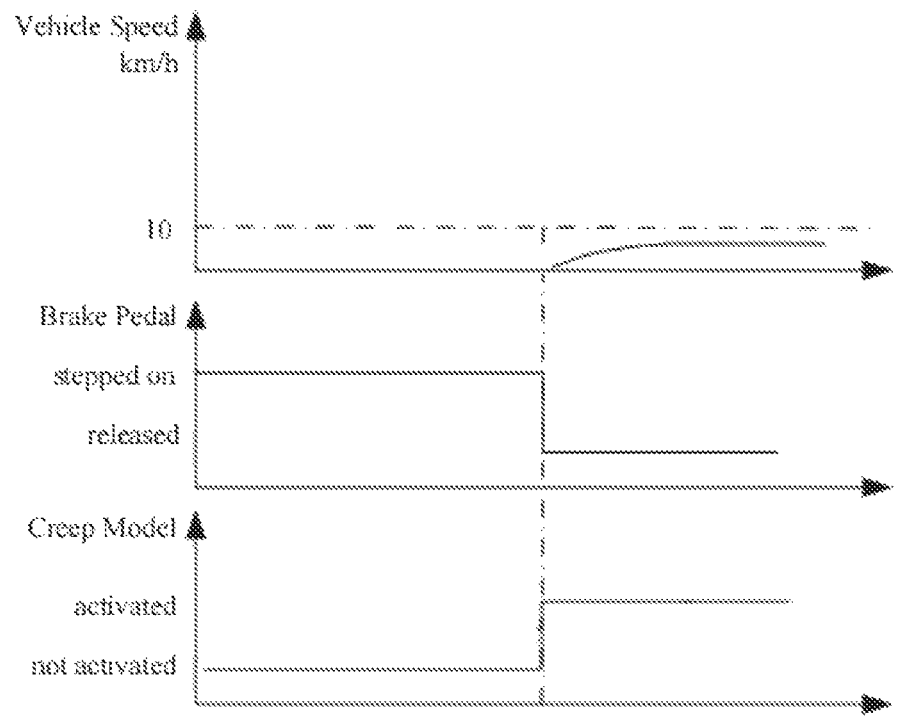
Figure 5:
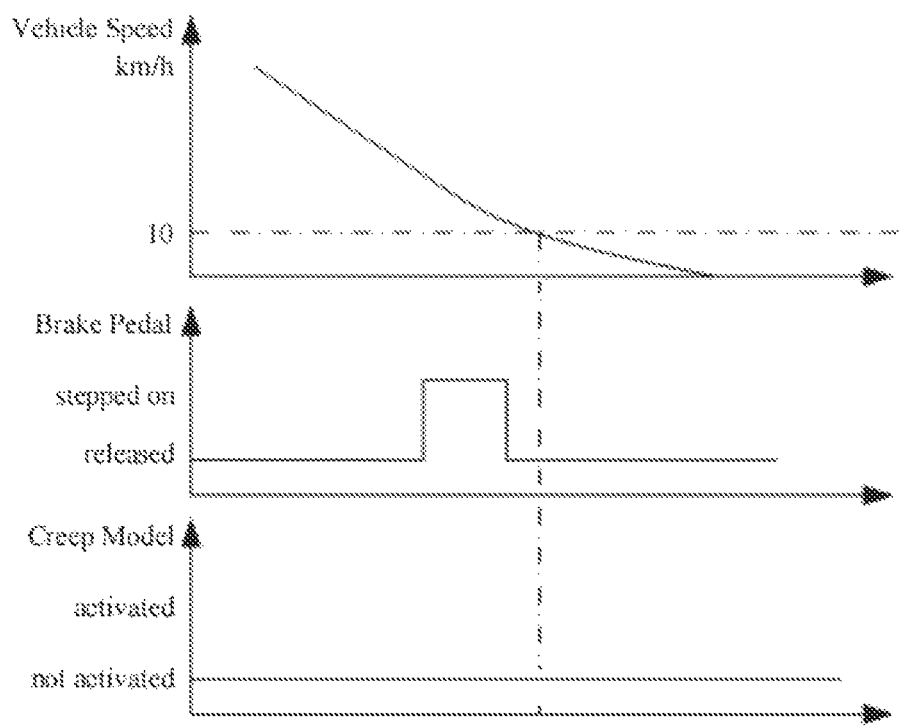
Figure 6:
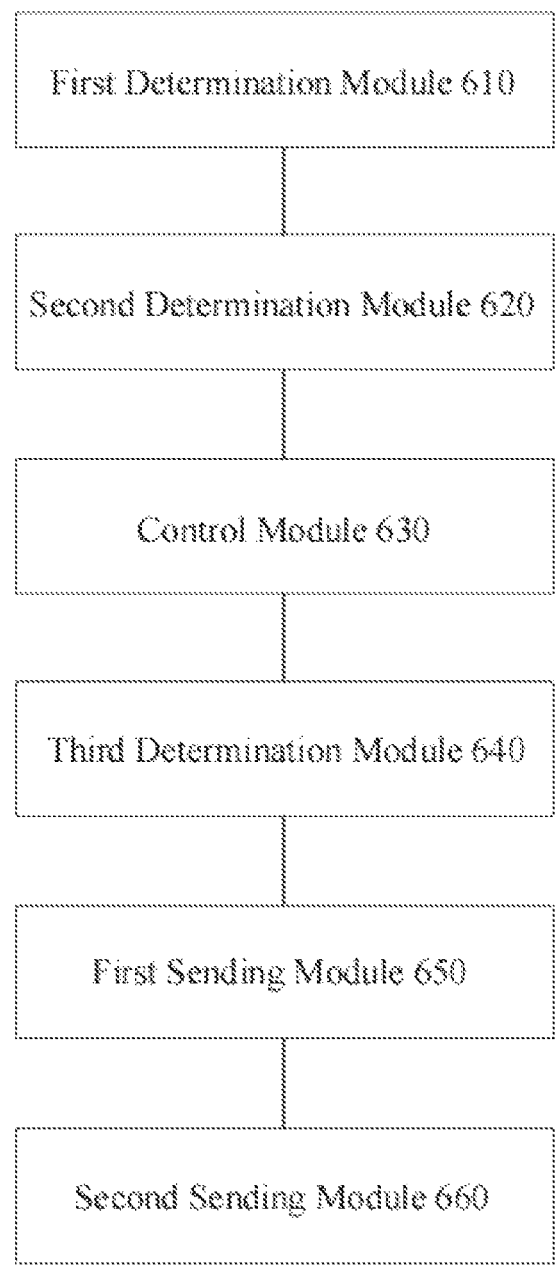

Some of the embodiments will be described in detail, with reference to the following figures, wherein like designations denote like members, wherein:

FIG. 1 shows a flowchart of a method for parking control of a new-energy vehicle according to an embodiment of the present application;

FIG. 2 illustrates a way of determining a creeping mode;
FIG. 3 illustrates a way of determining a creeping mode;
FIG. 4 illustrates a way of determining a creeping mode;
FIG. 5 illustrates a way of determining a creeping mode; and FIG. 6 shows a structural block diagram of a device for parking control of a new-energy vehicle according to an embodiment of the present application.

DETAILED DESCRIPTION

It should be noted that, without conflict, embodiments of the present application and features of the embodiments may be combined with each other.

It should be noted that the terms "first", "second", "third", "fourth", "fifth", "sixth" and "seventh", etc., mentioned in the embodiments of the present application are used for descriptive purposes only, and should not be understood as indicating or implying relative importance or implicitly specifying the number of the indicated features.

The present application will be described in detail below with reference to the drawings and in conjunction with the embodiments.

FIG. 1 shows a schematic flowchart of a method for parking control of a new-energy vehicle according to an embodiment of the present application. As shown in FIG. 1, an embodiment of the present application provides a method for parking control of a new-energy vehicle, and the method for parking control may be executed by a vehicle controller. The method for parking control of a new-energy vehicle may include steps S110 to S160.

In the step S110, it is determined whether a single-pedal mode is activated.

A single-pedal mode switch may be provided on the new-energy vehicle, and the single-pedal mode may be turned on by a driver through the single-pedal mode switch. The vehicle controller can detect a signal of the single-pedal mode switch to determine whether the single-pedal mode is activated. For example, if the signal of the single-pedal mode switch indicates that the switch is on (e.g. the value of the signal may be 1), then it is indicated that the single-pedal mode is activated, and if the signal of the single-pedal mode switch indicates that the switch is off (e.g. the value of the signal may be 0), then it is indicated that the single-pedal mode is not activated.

In the step S120, it is determined whether conditions for deceleration control are met when the single-pedal mode is activated.

The conditions for deceleration control at least include that: the gear is a driving gear; the creep mode is not activated; and the speed of the new-energy vehicle is not greater than a first preset value for a first preset time. For example, the first preset value may be set to 8 km/h, the first preset time may be set to 500 ms, and so on. It should be understood that the first preset value and the first preset time in the embodiments of the present application will not be limited to this, and can be set to any appropriate values according to actual needs. In an embodiment, the first preset time may be greater than a braking-request-determination time of the vehicle controller, that is, the vehicle speed still remains no greater than the first preset value after the braking-request-determination time is exceed. The braking-request-determination time may be a fixed time for the new-energy vehicle, and the braking-request-determination time may be different for different types of new-energy vehicles.

In the single-pedal mode, the vehicle may also enter a creep mode. Whether the vehicle is controlled to enter the creep mode or not may be determined according to the gear, the motion of the brake pedal and/or the speed of the vehicle. This mainly includes the following scenarios:

In a scenario that the gear of the new-energy vehicle is in a reverse gear (i.e., the R gear), the new-energy vehicle is controlled to enter the creep mode. That is, the driver's driving intention is to reverse the vehicle, and then the creep mode is suitable at this time.

In a scenario that the gear of the new-energy vehicle is shifted to the driving gear (i.e., the reverse gear R is shifted to the driving gear D or the neutral gear N is shifted to the driving gear D), the new-energy vehicle is controlled to enter the creep mode. That is, the driver's driving intention is to start the vehicle, at this time, it is more appropriate to enter the creep mode first, and then perform adjustment according to driving operations later.

In a scenario that the gear of the new-energy vehicle is in the driving gear and the speed is smaller than the preset speed, the new-energy vehicle is controlled to enter the creep mode after the brake pedal is moved from a depressed state to a fully released state. This scenario may also include three cases. As shown in FIG. 2, the preset speed may be 10 km/h (but not limited to this). The brake pedal is depressed when the speed is still greater than 10 km/h, and is fully released when the speed is smaller than 10 km/h. At this time, the driver's intention is to drive the vehicle to travel slowly. The new-energy vehicle, after a short deceleration, enters the creep mode. As shown in FIG. 3, the brake pedal is depressed when the speed is smaller than 10 km/h, and is fully released later. At this time, the driver's intention is to drive the vehicle to travel slowly. The new-energy vehicle, after a short deceleration, enters the creep mode. As shown in FIG. 4, the vehicle is in a stopped state, that is, the speed is 0. The brake pedal is stepped on before the vehicle starts and is fully released later. At this time, the driver's intention is to start the vehicle, the new energy vehicle is controlled to enter the creep mode first, and then adjusted later according to the driving operations.

FIG. 5 corresponds to the case of not entering the creep mode. As shown in FIG. 5, if the brake pedal is depressed when the speed is greater than 10 km/h and fully released when the speed is still greater than 10 km/h. At this time, the new-energy vehicle is controlled to not enter the creep mode, and if there is no follow-up further instruction, the vehicle will directly decelerate to a speed of 0 to perform a parking.

In this embodiment, it mainly considers a scenario that the new-energy vehicle is controlled to not enter the creep mode when the new-energy vehicle is in the driving gear (that is, this scenario does not conform to the cases of entering the creep mode as shown in FIGS. 2 to 4).

In an embodiment, during a driving process of the new-energy vehicle, the driver may change the driving intention at any time. Thus, in addition to the aforementioned items, the conditions for deceleration control may also include one or more of the following items: the vehicle is in a READY state; the single pedal is in a valid state; no brake request is sent by the vehicle controller to a motor controller; an opening-degree of an accelerator pedal is not greater than a first preset opening-degree; the brake pedal is not enabled or a pressure of a master brake cylinder is not greater than a first preset pressure for a fourth preset time; both a handbrake and an electronic handbrake are not activated; an available electric power for driving is not smaller than a first preset power; and a power system of the new-energy vehicle has no fault. The vehicle controller can determine whether a brake request has been sent according to its own parameters, the available electric power for driving can be obtained through a calculation by the vehicle controller, and other parameters can be obtained through a bus, for example. The failure of the power system of the new-energy vehicle may be, for example, a motor failure, a wheel failure, etc., and failure signals of each component of the power system may be sent to the vehicle controller through the bus. It should be noted that, in any embodiment of the present application, an on-board charger of the new-energy vehicle may not be considered no matter the power system of the new-energy vehicle is faulty or not, because whether the on-board charger is faulty or not does not affect the execution of the embodiment of the present application.

The value of the first preset opening-degree should conform to the fact that the accelerator pedal is in a brake region, for example, the first preset opening-degree may be 3% or the like. The non-activated brake pedal is suitable for an anti-lock braking system (ABS) configuration. The first preset pressure may be, for example, 1 bar or the like. For example, the fourth preset time may be greater than a determination period for triggering the creep mode, for example, the determination period for triggering the creep mode is usually smaller than 100 ms, and the fourth preset time may be set to 100 ms, for example. The first preset power may be, for example, 3 KW. It should be understood that the first preset opening-degree, the first preset pressure, the fourth preset time, and the first preset power in the embodiments of the present application can be set to any appropriate values according to actual needs, which will not be limited in here.

By further restricting the conditions for deceleration control, it is ensured that the vehicle state can be adjusted in real time according to the driving intention.

In the step S130, the new-energy vehicle is controlled to decelerate when the conditions for deceleration control are met.

In an embodiment, in the case that the conditions for deceleration control are met, the new-energy vehicle may enter a deceleration-control mode, in which the vehicle controller may, for example, calculate a negative torque value according to the opening-degree of the accelerator pedal, thereby controlling the vehicle to decelerate.

In the step S140, it is determined whether conditions for sending a brake request to a motor controller are met during a process of controlling the new-energy vehicle to decelerate.

The conditions for sending a brake request at least include that the speed is not greater than a second preset value for a second preset time. The second preset value is smaller than the first preset value. If the speed is smaller than the second preset value for a second preset time, it may be indicated that the deceleration control of the vehicle controller has been invalided, and the motor needs to be used for a further deceleration. The second preset value may be, for example, 3 km/h, or the like, and the first preset value may be, for example, 200 ms, or the like.

In an embodiment, during a driving process of the new-energy vehicle, the driver may change the driving intention at any time. Thus, in addition to the aforementioned items, the conditions for sending a brake request may include one or more of the following items: the vehicle is in a READY state; the single pedal is in a valid state; an opening-degree of an accelerator pedal is not greater than a second preset opening-degree; the brake pedal is not enabled or the pressure of the master brake cylinder is not greater than a second preset pressure for a fifth preset time; the creep mode is not activated; the gear is a driving gear; both the handbrake and the electronic handbrake are not activated; the available electric power for driving is not smaller than a second preset power; and the power system of the new-energy vehicle has no fault. The value of the second preset opening-degree should conform to the fact that the accelerator pedal is in the brake region, and the second preset opening-degree may be the same as or different from the aforementioned first preset opening-degree. For example, the second preset opening-degree may be set to 3%. The non-activated brake pedal is suitable for the ABS configuration. The second preset pressure may be equal to the first preset pressure, for example, may be 1 bar or the like. The fifth preset time may be equal to the fourth preset time, for example, may be equal to 100 ms. The available electric power for driving may be obtained through a calculation by the vehicle controller, and the second preset power may be equal to the first preset power, for example, may be equal to 3 kw. It should be understood that the second preset pressure, the fifth preset time, and the second preset power can be set to any appropriate values as required, which will not be limited in here.

By further restricting the conditions for sending a brake request, it is ensured that the new-energy vehicle can be effectively controlled according to the driving intention in real time.

In case that the conditions for sending a brake request to the motor controller are met, it may be continued to control the new-energy vehicle to decelerate.

In the step S150, the brake request is sent to the motor controller when the conditions for sending a brake request to the motor controller are met.

In response to the brake request, the new-energy vehicle may be controlled by the motor controller to enter a brake mode, and a state of the brake mode may be fed back from the motor controller to the vehicle controller, so that the vehicle controller can know whether the brake mode has been entered.

In the brake mode, the motor controller can perform a "zero speed control" on the motor, that is, the operating state jumps to a speed-control mode. The brake mode enables the speed of the new-energy vehicle continue to decrease until the speed is smaller than a third preset value. The third preset value may be smaller than the second preset value, for example, the third preset value may be 2 km/h, etc, however, in an embodiment of the present application, the third preset value can be set to any appropriate values according to actual needs, which will not be limited in here.

To ensure the ride comfort of the vehicle, when the motor controller jumps from a torque mode (that is, a deceleration control stage of the vehicle controller) to the speed mode, it is preferred to respond and perform adjustments on the basis of the current torque, instead of reloading after the torque is cleared. In an embodiment, the motor controller can respond and perform adjustments based on the current torque instead of reloading after the torque is cleared, when the MCU switches between the torque mode and speed mode to ensure the ride comfort of the vehicle. It can be anticipated that to limit a slope-slip speed of the vehicle on a steep slope, the MCU should distinguish the "locked-rotor" state of the motor based on the electric drive system and thermal management. The limit to torque adjustment can be gradually released when the motor is not in the "locked-rotor" state, so as to improve the capability of speed limit, but attention should be paid to avoid vehicle shaking and jumping during an adjustment process.

In the step S160, a parking request is sent to an electronic handbrake, when the new-energy vehicle is in the brake mode and a speed of the new-energy vehicle is smaller than a third preset value for a third preset time, to enable the new-energy vehicle to enter a parking mode.

In response to the parking request, a pull-up action may be performed on the electronic handbrake to place the new-energy vehicle in a parking mode. The third preset time may be, for example, 5s, however, in an embodiment of the present application, the third preset time may be set to any appropriate value as required, which is not limited inhere. The speed is smaller than the third preset value for a third preset time, indicating that the driver has no intention to further change the state of the vehicle, and then the new-energy vehicle may be controlled to enter the parking mode.

In an embodiment, the speed may also be determined after the parking request is received by the electronic handbrake. If it is determined via the electronic handbrake that the speed is greater than a certain preset speed (for example, the speed is greater than 3 km/h), and then the pull-up action may not be performed on the electronic handbrake. Information on whether the pull-up action is performed or not may be fed back via the electronic handbrake to the vehicle controller, so that the vehicle controller can know the status of the electronic handbrake. If the pull-up action is not performed on the electronic handbrake, then a corresponding control action may be performed by the vehicle controller based on the speed and the driver's operation intention. If it is determined via the electronic handbrake that the speed is not greater than the certain preset speed (for example, the speed is greater than 3 km/h), after the parking request is received, and then the pull-up action may be performed on the electronic handbrake.

By the coordinated control of the vehicle controller, the motor controller, and the electronic handbrake, and by a real-time recognition of the driver's operation intention, the method for parking control of a new-energy vehicle provided by the embodiment of the present application can achieve a smooth stop and parking of the vehicle without requiring the brake pedal in the single-pedal mode.

In an embodiment, during the process of controlling the new-energy vehicle to decelerate, whether the conditions for deceleration control are met can still be determined by the vehicle controller in real time. If the conditions for deceleration control are not met, the new-energy vehicle can be controlled to exit a deceleration driving. In an exemplary embodiment, the deceleration driving will be exited when any one or more of the following events occur during the deceleration driving, such as the vehicle is not in the READY state; the single pedal is in an invalid state; the speed is greater than a preset speed (for example, the speed is greater than 10 km/h) for a preset time (for example, 500 ms); a brake request is sent by the vehicle controller to the motor controller; the opening-degree of the accelerator pedal is greater than a predetermined value (for example, 5%), and a torque request corresponding to the opening-degree of the accelerator pedal is greater than a sum of an actual torque of the motor and a preset torque (e.g., 5 Nm) for a certain preset time (e.g., 50 ms); the brake pedal is enabled (suitable for the ABS) or the pressure of the master brake cylinder is greater than a preset pressure (for example, 1 bar); the creep mode is activated; the gear is the R gear or N gear; the handbrake and/or electronic handbrake are activated; the available electric power for driving calculated by the vehicle controller is smaller than a certain preset power (for example, 2 kw); the power system of the new-energy vehicle has a fault. During the process of controlling the new-energy vehicle to decelerate, the driver's operation intention may also be detected by the vehicle controller in real time, to effectively control the new-energy vehicle.

In an embodiment, in response to receiving the brake request sent by the vehicle controller, the motor controller may determine whether conditions for entering the brake mode are met. The conditions for entering the brake mode may include that: the brake request is received; the vehicle controller stops controlling the new-energy vehicle to decelerate, and whether the vehicle controller has stopped the deceleration control of the new-energy vehicle can be determined according to the vehicle speed, such as, when the vehicle speed is not greater than the second preset value (For example, 3 km/h) for a second preset time (e.g., 200 ms); a motor speed is within a preset range (e.g., the preset range may be [−240 rpm, 240 rpm]) for a sixth preset time (e.g., 24 ms), where the motor speed can be calculated based on the speed; and the motor controller has no fault. The motor controller may control the new-energy vehicle to enter the brake mode when the above conditions for entering the brake mode are met.

After the new-energy vehicle is controlled to enter the brake mode, whether conditions for exiting the brake mode are met may also be determined by the motor controller in real time. The conditions for exiting the brake mode may include one or more of the following items that: a request for exiting the brake mode is received; the vehicle controller starts to control the new-energy vehicle to decelerate; the motor speed is greater than a seventh preset value for the sixth preset time, where the seventh preset value may be, for example, 240 rpm, and the sixth preset time may be, for example, 24 ms; and the motor controller is faulty. The motor controller will control the new-energy vehicle to exit the brake mode when any one or more of the above items are met.

After the new-energy vehicle is controlled to enter the brake mode, the state of the brake mode may be fed back by the motor controller to the vehicle controller, so that the vehicle controller can know whether the brake mode has been entered. After the brake mode is entered, the vehicle controller may still determine whether the conditions of the brake request are met in real time. If the conditions of the brake request are not met, a request for exiting the brake mode may be sent to the motor controller, and the motor controller may control the new-energy vehicle to exit the brake mode in response to the request for exiting the brake mode. In an exemplary embodiment, if the vehicle is in the brake mode, one or more of the following events may occur: the vehicle is not in the READY state; the single pedal is in an invalid state; the speed is greater than a preset speed (for example, the speed is greater than 10 km/h) for a preset time (for example, 500 ms); a brake request is sent by the vehicle controller to the motor controller; the opening-degree of the accelerator pedal is greater than a predetermined value (for example, 5%), and a torque request corresponding to the opening-degree of the accelerator pedal is greater than a sum of an actual torque of the motor and a preset torque (e.g., 5 Nm) for a certain preset time (e.g., 50 ms); the brake pedal is enabled (suitable for the ABS) or the pressure of the master brake cylinder is greater than a preset pressure (for example, 1 bar); the creep mode is activated; the gear is the R gear or N gear; the handbrake and/or electronic handbrake are activated; the available electric power for driving calculated by the vehicle controller is smaller than a certain preset power (for example, 2 kw); and the power system of the new-energy vehicle has a fault. When the new-energy vehicle is in the brake mode, the driver's operation intention may always be detected by the vehicle controller in real time, to effectively control the new-energy vehicle.

In an embodiment, the information that the pull-up action is performed on the electronic handbrake is fed back to the vehicle controller, and based on this information, it may be determined by the vehicle controller that the new-energy vehicle is in the parking mode. In case that the new-energy vehicle is in the parking mode, it is determined by the vehicle controller that the new-energy vehicle exits the brake mode, or the speed of the new-energy vehicle is not smaller than the third preset value (which may be caused by the driver's intervention), and then a request for exiting the parking mode may be sent by the vehicle controller to the electronic handbrake. The electronic handbrake may no longer be in a pulled-up state in response to this request, thereby causing the new-energy vehicle to exit the parking mode. When the new-energy vehicle is in the parking mode, the driver's operation intention may still be detected by the vehicle controller in real time, thereby achieving an effective control of the new-energy vehicle.

FIG. 6 shows a structural block diagram of a device for parking control of a new-energy vehicle according to an embodiment of the present application. As shown in FIG. 6, an embodiment of the present application also provides a device for parking control of a new-energy vehicle. The device may be arranged in a vehicle controller. The device may include: a first determination module 610, a second determination module 620, a control module 630, a third determination module 640, a first sending module 650, and a second sending module 650. The first determination module 610 is configured to determine whether a single pedal mode is activated. The second determination module 620 is configured to determine whether conditions for deceleration control are met when the single-pedal mode is activated. The conditions for deceleration control at least include that a speed of the new-energy vehicle is smaller than a first preset speed for a first preset time. The control module 630 is configured to control the new-energy vehicle to decelerate when the conditions for deceleration control are met. The third determination module 640 is configured to determine whether conditions for sending a brake request to the motor controller are met during a process of controlling the new-energy vehicle to decelerate. The conditions for sending a brake request at least include that the speed is not greater than a second preset value for a second preset time. The second preset value is smaller than the first preset value. The first sending module 650 is configured to send the brake request to the motor controller when the conditions for sending a brake request to the motor controller are met. The motor controller, in response to the brake request, controls the new-energy vehicle to enter a brake mode to reduce the speed of the new-energy vehicle to be smaller than a third preset value. The third preset value is smaller than the second preset value. The second sending module 660 is configured to send a parking request to an electronic handbrake, when the new-energy vehicle is in the brake mode and the speed of the new-energy vehicle is smaller than the third preset value for a third preset time.

In an embodiment, during the process of controlling the new-energy vehicle to decelerate, whether the conditions for deceleration control are met will still be determined by the second determination module. If the conditions for deceleration control are not met, the control module may control the new-energy vehicle to exit a deceleration driving.

In an embodiment, after the new-energy vehicle enters the brake mode, whether the conditions for sending a brake request are met will still be determined by the third determination module, and if the conditions for sending the brake request are not met, a request for exiting the brake mode may be sent by the first sending module to the motor controller. The motor controller controls the new-energy vehicle to exit the brake mode in response to the request for exiting the brake mode.

In an embodiment, when the new-energy vehicle is in a parking mode, a request for exiting the parking mode may be sent by the second sending module to the electronic handbrake, if the new-energy vehicle is controlled to exit the brake mode or the speed of the new-energy vehicle is not smaller than the third preset value. The electronic handbrake may no longer be in a pulled-up state in response to this request, thereby causing the new-energy vehicle to exit the parking mode.

In an embodiment, in response to receiving the brake request, the motor controller may determine whether conditions for entering the brake mode are met. If the conditions for entering the brake mode are met, the new-energy vehicle is controlled to enter the brake mode. If the conditions for exiting the brake mode are met after the new-energy vehicle is entered the brake mode, the new-energy vehicle can be controlled to exit the brake mode.

In an embodiment of the present application, specific contents of the conditions for deceleration control, the conditions for sending a brake request, the conditions for entering the brake mode, and the conditions for exiting the brake mode are the same as those described above.

Specific working principles and benefits of the device for parking control of a new-energy vehicle provided by an embodiment of the present application may be the same as the specific working principles and benefits of the method for parking control of a new-energy vehicle provided by an embodiment of the present application, which will not be repeated here.

The device for parking control of a new-energy vehicle includes a processor and a memory. The above modules are stored in the memory as program units, and the above program units stored in the memory are executed by the processor to realize corresponding functions. The processor includes a kernel to call the corresponding program unit from the memory. One or more kernels can be provided, and the method for parking control of a new-energy vehicle according to any embodiment of the present application can be executed by adjusting kernel parameters. Memory may include non-persistent memory, random access memory (RAM) and/or non-volatile memory in computer readable media, such as read only memory (ROM) or flash memory (flash RAM), the memory includes at least one memory chip.

Correspondingly, an embodiment of the present application also provides a vehicle controller, and the vehicle controller may include the device for parking control of a new-energy vehicle according to any embodiment of the present application.

Correspondingly, an embodiment of the present application also provides a new-energy vehicle, where the new-energy vehicle may include the vehicle controller according to an embodiment of the present application, and the new-energy vehicle may be, for example, a pure electric vehicle or the like.

Correspondingly, an embodiment of the present application also provides a machine-readable storage medium, and in the machine-readable storage medium a program is stored, when the program is executed, the method for parking control of the new-energy vehicle according to any embodiment of the present application is implemented. Thee machine-readable storage medium includes but is not limited to a phase change memory (PRAM), a static random access memory (SRAM), a dynamic random access memory (DRAM), or other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cassette, a magnetic tape-disk storage or other magnetic storage devices and various media that can store program codes.

An embodiment of the present application provides a processor for running a program. The method for controlling parking of a new-energy vehicle according to any embodiment of the present application is executed when the program is running.

An embodiment of the present application provides a device, which includes a processor, a memory, and a program stored in the memory and executable on the processor. the program when being executed by the processor, causes the method for parking control of the new-energy vehicle according to any embodiment of the present application to be implemented. The device in this disclosure may be a server, a PC, a PAD, a mobile phone, and so on.

The present application also provides a computer program product (non-transitory computer readable storage medium having instructions, which when executed by a processor, perform actions) that, when executed on a data processing device, is adapted to execute a program initialized with steps of the method for parking control of a new-energy vehicle according to any embodiment of the present application.

It will be appreciated for those skilled in the art that the embodiments of the present application may be provided as a method, a system, or a computer program product.

Accordingly, the present application may be implemented in form of an entirely hardware embodiment, an entirely software embodiment, or an embodiment combining software and hardware aspects. Furthermore, the present application may be implemented in form of a computer program product embodied on one or more computer-usable storage media (including, but not limited to, a disk storage, a CD-ROM, an optical storage, etc.) having computer-usable program code embodied therein.

The present application is described with reference to flowchart illustrations and/or block diagrams of methods, apparatus (systems), and computer program products according to the embodiments of the present application. It should be understood that each flow and/or block in the flowchart illustrations and/or block diagrams, and combinations of flows and/or blocks in the flowchart illustrations and/or block diagrams, can be implemented by computer program instructions. These computer program instructions may be provided to the processor of a general-purpose computer, a special purpose computer, embedded processor or other programmable data processing device to produce a machine such that the instructions executed by the processor of the computer or other programmable data processing device generate means for implementing the functions specified in one or more flows of the flowcharts and/or one or more blocks of the block diagrams.

These computer program instructions may also be stored in a computer-readable memory capable of directing a computer or other programmable data processing devices to function in a particular manner, such that the instructions stored in the computer-readable memory result in an article of manufacture including instruction means, the instruction means may implement the functions specified in one or more flows of the flowcharts and/or one or more blocks of the block diagrams.

These computer program instructions may also be loaded on a computer or other programmable data processing device to cause a series of operational steps to be performed on the computer or other programmable device to generate a computer-implemented process, such that the instructions executed on the computer or other programmable device can provide steps for implementing the functions specified in one or more flows of the flowcharts and/or one or more blocks of the block diagrams.

In a typical configuration, a computing device includes one or more processors (CPUs), an input/output interface, a network interface, and a memory.

Memory may include a non-persistent memory, a random-access memory (RAM) and/or a non-volatile memory in computer readable media, such as, a read only memory (ROM) or a flash memory (flash RAM). Memory is an example of a computer-readable medium.

The computer-readable media includes a persistent or non-permanent media, a removable or non-removable media, and storage of information may be implemented by any method or technology. Information may be computer readable instructions, data structures, modules of programs, or other data. Examples of computer storage media include, but are not limited to, a phase-change memory (PRAM), a static random access memory (SRAM), a dynamic random access memory (DRAM), or other types of random access memory (RAM), a read only memory (ROM), an electrically erasable programmable read only memory (EEPROM), a flash memory or other memory technologies, a compact disc read only memory (CD-ROM), a digital versatile disc (DVD) or other optical storage, a magnetic tape cassette, a magnetic tape magnetic disk storage or other magnetic storage devices and various non-transmission medium that can be used to store information that can be accessed by a computing device. As defined herein, computer-readable media does not include a transitory computer-readable media, such as modulated data signals and carrier waves.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed is:

1. A method for parking control of a new-energy vehicle, executed by a vehicle controller, the method comprising:
determining whether a single-pedal mode is activated;
determining whether conditions for deceleration control are met when the single-pedal mode is activated, wherein the conditions for deceleration control at least comprise that a gear of the new-energy vehicle is a driving gear, a creep mode is not activated, and a speed of the new-energy vehicle is not greater than a first preset value for a first preset time;
controlling the new-energy vehicle to decelerate when the conditions for deceleration control are met;
determining whether conditions for sending a brake request to a motor controller are met during a process of controlling the new-energy vehicle to decelerate, wherein the conditions for sending the brake request at least comprise that the speed is not greater than a second preset value for a second preset time, and wherein the second preset value is smaller than the first preset value;
sending the brake request to the motor controller when the conditions for sending the brake request to the motor controller are met, whereby enabling the motor controller, in response to the brake request, to control the new-energy vehicle to enter a brake mode, to reduce the speed of the new-energy vehicle to be smaller than a third preset value, wherein the third preset value is smaller than the second preset value; and
sending a parking request to an electronic handbrake when the new-energy vehicle is in the brake mode and the speed of the new-energy vehicle is smaller than the third preset value for a third preset time, to enable the new-energy vehicle to enter a parking mode.

2. The method for parking control of a new-energy vehicle according to claim 1, wherein the conditions for deceleration control further comprise one or more of the following items: the vehicle is in a READY state; the single pedal is in a valid state; no brake request is sent by the vehicle controller to the motor controller; an opening-degree of an accelerator pedal is not greater than a first preset opening-degree; a brake pedal is not enabled or a pressure of a master brake cylinder is not greater than a first preset pressure for a fourth preset time; both a handbrake and the electronic handbrake are not activated; an available electric power for driving is not smaller than a first preset power; and a power system of the new-energy vehicle has no fault.

3. The method for parking control of a new-energy vehicle according to claim 1, further comprising:
controlling the new-energy vehicle to exit a deceleration driving, during a process of controlling the new-energy vehicle to decelerate, when the conditions for deceleration control are not met.

4. The method for parking control of a new-energy vehicle according to claim 1, wherein the conditions for sending the brake request further comprise one or more of the following items: the vehicle is in a READY state; the single pedal is in a valid state; an opening-degree of an accelerator pedal is not greater than a second preset opening-degree; a brake pedal is not enabled or a pressure of a master brake cylinder is not greater than a second preset pressure for a fifth preset time; the creep mode is not activated; the gear is the driving gear; both a handbrake and the electronic handbrake are not activated; an available electric power for driving is not smaller than a second preset power; and a power system of the new-energy vehicle has no fault.

5. The method for parking control of a new-energy vehicle according to claim 1, further comprising:
determining, in response to the new-energy vehicle entering the brake mode, whether the conditions for sending the brake request are met; and
sending a request for exiting the brake mode to the motor controller when the conditions for sending the brake request are not met, wherein the motor controller, in response to the request for exiting the brake mode, controls the new-energy vehicle to exit the brake mode.

6. The method for parking control of a new-energy vehicle according to claim 5, further comprising:
sending, in case that the new-energy vehicle is in the parking mode, a request for exiting the parking mode to the electronic handbrake when the new-energy vehicle is controlled to exit the brake mode or the speed of the new-energy vehicle is not smaller than the third preset value.

7. The method for parking control of a new-energy vehicle according to claim 1, wherein the controlling, in response to the brake request, the new-energy vehicle to enter the brake mode by the motor controller comprises:
determining, by the motor controller, whether conditions for entering the brake mode are met, in response to receiving the brake request, wherein the conditions for entering the brake mode comprise that the brake request is received, the vehicle controller stops controlling the new-energy vehicle to decelerate, the motor speed is within a preset range for a sixth preset time, and the motor controller has no fault; and
controlling the new-energy vehicle to enter the brake mode when the conditions for entering the brake mode are met, and
wherein the method further comprises controlling, after the new-energy vehicle is entered the brake mode, the new-energy vehicle to exit the brake mode by the motor controller, when conditions for exiting the brake mode are met, and the conditions for exiting the brake mode comprise one or more of the following items: a request for exiting the brake mode is received; the vehicle controller starts to control the new-energy vehicle to decelerate; a motor speed is greater than a seventh preset value for a sixth preset time; and the motor controller has a fault.

8. A vehicle controller, comprising: a processor, and a storage medium storing a computer program, wherein the computer program, when being executed by the processor, causes the vehicle controller to carry out operations that comprises:
determining whether a single-pedal mode is activated;
determining whether conditions for deceleration control are met when the single-pedal mode is activated, wherein the conditions for deceleration control at least comprise that a gear of the new energy vehicle is a driving gear, a creep mode is not activated, and a speed of the new energy vehicle is not greater than first preset value for a first preset time;
controlling the new-energy vehicle to decelerate when the conditions for deceleration control are met;
determining whether conditions for sending a brake request to a motor controller are met during a process of controlling the new-energy vehicle to decelerate, wherein the conditions for sending the brake request at least comprise that the speed is not greater than a second present value for a second preset time, and wherein the second preset value is smaller than the first preset value;

sending the brake request to the motor controller when the conditions for sending the brake request to the motor controller are met, whereby enabling the motor controller, in response to the brake request, to control the new energy vehicle to enter a brake mode, to reduce the speed of the new-energy vehicle to be smaller than a third preset value, wherein the third preset value is smaller than the second preset value; and sending a parking request to an electronic handbrake when the new-energy vehicle is in the brake mode and the speed of the new-energy vehicle is smaller than the third preset value for a third preset time, to enable the new-energy vehicle to enter a parking mode.

9. A new-energy vehicle, comprising:

a vehicle controller, comprising: a processor, and a storage medium storing a computer program, wherein the computer program, when being executed by the processor, causes the vehicle controller to carry out operations that comprises:

determining whether a single-pedal mode is activated;

determining whether conditions for deceleration control are met when the single-pedal mode is activated, wherein the conditions for deceleration control at least comprise that a gear of the new-energy vehicle is a driving gear, a creep mode is no activated, and a speed of the new-energy vehicle is not greater than a first preset value for a first preset time;

controlling the new-energy vehicle to decelerate when the conditions for deceleration control are met;

determining whether conditions for sending a brake request to a motor controller are met during a process of controlling the new-energy vehicle to decelerate, wherein the conditions for sending the brake request at least comprise that the speed is not greater than a second preset value for a second preset time, and wherein the second preset value is smaller than the first preset value;

sending the brake request to the motor controller when the conditions for sending the brake request to the motor controller are met, whereby enabling the motor controller, in response to the brake request, to control the new-energy vehicle to enter a brake mode, to reduce the speed of the new-energy vehicle to be smaller than a third preset value, wherein the third preset value is smaller than the second preset value; and sending a parking request to an electronic handbrake when the new-energy vehicle is in the brake mode and the speed of the new-energy vehicle is smaller than the third preset value for a third preset time, to enable the new-energy vehicle to enter a parking mode.

10. The method for parking control of a new-energy vehicle according to claim 2, further comprising:

controlling the new-energy vehicle to exit a deceleration driving, during the process of controlling the new-energy vehicle to decelerate, when the conditions for deceleration control are not met.

11. The method for parking control of a new-energy vehicle according to claim 4, further comprising:

determining, in response to the new-energy vehicle entering the brake mode, whether the conditions for sending the brake request are met; and sending a request for exiting the brake mode to the motor controller when the conditions for sending the brake request are not met, wherein the motor controller, in response to the request for exiting the brake mode, controls the new-energy vehicle to exit the brake mode.

12. The method for parking control of a new-energy vehicle according to claim 4, wherein the controlling, in response to the brake request, the new-energy vehicle to enter the brake mode by the motor controller comprises:

determining, by the motor controller, whether conditions for entering the brake mode are met, in response to receiving the brake request, wherein the conditions for entering the brake mode comprise that the brake request is received, the vehicle controller stops controlling the new-energy vehicle to decelerate, the motor speed is within a preset range for a sixth preset time, and the motor controller has no fault; and controlling the new-energy vehicle to enter the brake mode when the conditions for entering the brake mode are met, and wherein the method further comprises controlling, after the new-energy vehicle is entered the brake mode, the new-energy vehicle to exit the brake mode by the motor controller, when conditions for exiting the brake mode are met, and the conditions for exiting the brake mode comprise one or more of the following items: a request for exiting the brake mode is received; the vehicle controller starts to control the new-energy vehicle to decelerate; a motor speed is greater than a seventh preset value for a sixth preset time; and the motor controller has a fault.

13. The method for parking control of a new-energy vehicle according to claim 5, wherein the controlling, in response to the brake request, the new-energy vehicle to enter the brake mode by the motor controller comprises:

determining, by the motor controller, whether conditions for entering the brake mode are met, in response to receiving the brake request, wherein the conditions for entering the brake mode comprise that the brake request is received, the vehicle controller stops controlling the new-energy vehicle to decelerate, the motor speed is within a preset range for a sixth preset time, and the motor controller has no fault; and controlling the new-energy vehicle to enter the brake mode when the conditions for entering the brake mode are met, and wherein the method further comprises controlling, after the new-energy vehicle is entered the brake mode, the new-energy vehicle to exit the brake mode by the motor controller, when conditions for exiting the brake mode are met, and the conditions for exiting the brake mode comprise one or more of the following items: a request for exiting the brake mode is received; the vehicle controller starts to control the new-energy vehicle to decelerate; a motor speed is greater than a seventh preset value for a sixth preset time; and the motor controller has a fault.

14. The vehicle controller according to claim 8, wherein the conditions for deceleration control further comprise one or more of the following items: the vehicle is in a READY state; the single pedal is in a valid state; no brake request is sent by the vehicle controller to the motor controller; an opening-degree of an accelerator pedal is not greater than a first preset opening-degree; a brake pedal is not enabled or a pressure of a master brake cylinder is not greater than a first preset pressure for a fourth preset time; both a handbrake and the electronic handbrake are not activated; an available electric power for driving is not smaller than a first preset power; and a power system of the new-energy vehicle has no fault.

15. The vehicle controller according to claim 8, the operations further comprise:
controlling the new-energy vehicle to exit a deceleration driving, during the process of controlling the new-energy vehicle to decelerate, when the conditions for deceleration control are not met.

16. The vehicle controller according to claim 8, wherein the conditions for sending the brake request further comprise one or more of the following items: the vehicle is in a READY state; the single pedal is in a valid state; an opening-degree of an accelerator pedal is not greater than a second preset opening-degree; a brake pedal is not enabled or a pressure of a master brake cylinder is not greater than a second preset pressure for a fifth preset time; the creep mode is not activated; the gear is the driving gear; both a handbrake and the electronic handbrake are not activated; an available electric power for driving is not smaller than a second preset power; and a power system of the new-energy vehicle has no fault.

17. The vehicle controller according to claim 8, the operations further comprise:
determining, in response to the new-energy vehicle entering the brake mode, whether the conditions for sending the brake request are met; and
sending a request for exiting the brake mode to the motor controller when the conditions for sending the brake request are not met, wherein the motor controller, in response to the request for exiting the brake mode, controls the new-energy vehicle to exit the brake mode.

18. The vehicle controller according to claim 8, the operations further comprise: sending, in case that the new-energy vehicle is in the parking mode, a request for exiting the parking mode to the electronic handbrake when the new-energy vehicle is controlled to exit the brake mode or the speed of the new-energy vehicle is not smaller than the third preset value.

19. The vehicle controller according to claim 8, wherein the operation of controlling, in response to the brake request, the new-energy vehicle to enter the brake mode by the motor controller comprises:
determining, by the motor controller, whether conditions for entering the brake mode are met, in response to receiving the brake request, wherein the conditions for entering the brake mode comprise that the brake request is received, the vehicle controller stops controlling the new-energy vehicle to decelerate, the motor speed is within a preset range for a sixth preset time, and the motor controller has no fault; and
controlling the new-energy vehicle to enter the brake mode when the conditions for entering the brake mode are met, and
wherein the operations further comprise controlling, after the new-energy vehicle is entered the brake mode, the new-energy vehicle to exit the brake mode by the motor controller, when conditions for exiting the brake mode are met, and the conditions for exiting the brake mode comprise one or more of the following items: a request for exiting the brake mode is received; the vehicle controller starts to control the new-energy vehicle to decelerate; a motor speed is greater than a seventh preset value for a sixth preset time; and the motor controller has a fault.

\* \* \* \* \*